United States Patent
Singer et al.

(10) Patent No.: US 10,869,488 B2
(45) Date of Patent: Dec. 22, 2020

(54) SAUSAGE PROCESSING APPARATUS

(71) Applicant: Singer & Sohn GmbH, Berching (DE)

(72) Inventors: Manfred Singer, Berching (DE); Dieter Koller, Mühlhausen (DE)

(73) Assignee: SINGER & SOHN GMBH, Berching (DE)

(*) Notice: Subject to any disclaimer, the term of this patent is extended or adjusted under 35 U.S.C. 154(b) by 0 days.

(21) Appl. No.: 16/547,963

(22) Filed: Aug. 22, 2019

(65) Prior Publication Data
US 2020/0060295 A1  Feb. 27, 2020

(30) Foreign Application Priority Data

Aug. 22, 2018 (DE) .......................... 10 2018 120 507

(51) Int. Cl.
*A22C 11/00* (2006.01)
*A23L 13/60* (2016.01)

(52) U.S. Cl.
CPC ............ *A22C 11/008* (2013.01); *A23L 13/65* (2016.08); *A23V 2002/00* (2013.01)

(58) Field of Classification Search
CPC ....... A22C 15/00; A22C 15/001; A22C 11/00; A22C 11/008

(Continued)

(56) References Cited

U.S. PATENT DOCUMENTS 6,141,943 A    11/2000  Hart
7,131,904 B2 * 11/2006  Shefet .................. A22C 11/008
                                                     452/51

(Continued)

FOREIGN PATENT DOCUMENTS

DE    202015104994 U1    9/2015
DE    2020151041994 U1   9/2015
DE    102017123517 A1    4/2019

OTHER PUBLICATIONS

German Patent Application No. 10 2018 120 507.4, Office Action dated Mar. 31, 2020, 9 Pages.

(Continued)

*Primary Examiner* — Richard T Price, Jr.

(74) *Attorney, Agent, or Firm* — Lucas & Mercanti, LLP; Klaus P. Stoffel

(57) ABSTRACT

A sausage processing apparatus, including a circulating compartmented belt, a downstream compartmented roller, wherein a sausage is transferred from a compartment of the belt into a compartment of the roller, and a second circulating transport device, onto which the sausages are transferred from the compartments of the roller. A control device controls the conveying operation of the second transport device and of the roller. A sensor device detects the occupancy of the compartments of the belt. The control device controls the conveying operation of the roller and the second transport device dependent on the detection result of the sensor device such that, upon detection of one or more successive unoccupied compartments of the belt, the conveying operation of the roller and of the second transport device is stopped or slowed when the unoccupied compartment is in or is entering a transfer position and, upon detection of an occupied compartment, the conveying operation is resumed when the occupied compartment is in or is entering the transfer position.

10 Claims, 13 Drawing Sheets

(58) Field of Classification Search
USPC .............................................. 452/30–32, 51
See application file for complete search history.

(56) References Cited

U.S. PATENT DOCUMENTS

| | | | |
|---|---|---|---|
| 9,504,263 B2* | 11/2016 | Meggelaars et al. | B65B 5/10 |
| 9,944,471 B2 | 4/2018 | Singer et al. | |
| 10,278,402 B2 | 5/2019 | Singer et al. | |
| 2004/0038637 A1* | 2/2004 | van den Dungen | A22C 17/0093 |
| | | | 452/51 |
| 2007/0045083 A1 | 3/2007 | Hart | |
| 2009/0053985 A1* | 2/2009 | Topfer | B65G 59/062 |
| | | | 452/51 |
| 2011/0124276 A1* | 5/2011 | Waldrop | A22C 11/008 |
| | | | 452/51 |
| 2014/0106654 A1* | 4/2014 | Meggelaars | B65B 5/10 |
| | | | 452/51 |
| 2019/0056712 A1 | 2/2019 | Santais | |

OTHER PUBLICATIONS

European Patent Application No. 19189122.5, European Search Report dated Jan. 15, 2020, 8 Pages.

\* cited by examiner

SAUSAGE PROCESSING APPARATUS

CROSS-REFERENCE TO RELATED APPLICATIONS

The present application claims priority of DE 10 2018 120 507.4, filed Aug. 22, 2018, the priority of this application is hereby claimed and this application is incorporated herein by reference.

BACKGROUND OF THE INVENTION

The invention relates to a sausage processing apparatus.

Sausages, which are commonly composed of a sausage skin and sausage meat or sausage mixture filled therein, are produced in large numbers by machine. For this purpose, in a filling apparatus, the sausage meat or the sausage mixture is introduced into the sausage skin, following which the individual sausages are twisted off, separated and subsequently sorted and aligned, in order to finally be gripped by means of a corresponding transfer device, for example a gripper device, and transferred for example into a packaging or transport tray. An example of such an apparatus for treating sausages is presented in DE 20 2015 104 994 U1. The sausage processing apparatus described in said document comprises not only a sorting device positioned downstream of the filling and twisting-off device but also a circulating first transport or conveying device in the form of a compartmented belt, downstream of which there is positioned a grouping device, in which the sausages transported in by the first conveying device are collected into a group. Said grouping device is followed by a second conveying device, onto which the sausages, situated adjacent to one another and in groups, are transferred from the grouping device, such that, on said second transport or conveying device, the spaced-apart sausage groups are received, and can be conveyed, in succession. Downstream of said second transport or conveying device, there is finally positioned a transfer device in the form of a gripping device for gripping a sausage group and transferring and placing the sausage group into a receiving container or the like.

The grouping device described in said document serves, as described, for forming a sausage group which comprises a defined number of sausages, which sausage group is transferred onto the second transport or conveying device, such that, by means of the grouping device, individual, mutually spaced-apart sausage groups are formed which are arranged spaced apart by several centimeters on the second transport or conveying device. The grouping device has two drums which are rotatable about the same axis, which are positioned one downstream of the other and which can be driven separately, wherein each drum receives a corresponding number of sausages, corresponding to the group size, and, when the drum has been rotated into the transfer position, the drum then releases the sausages as a sausage group. Owing to the two drums, it is accordingly possible with this drum unit for two sausage groups to be formed during one 360 degree rotation.

Although, with such a grouping device, it is possible for the defined sausage groups to be formed in a very exact and continuous manner, there is nevertheless a demand for improvement. Aside from the fact that the configuration of the drum unit is cumbersome, the group formation and the spaced-apart dispensing of individual groups onto the second transport or conveying device also has an influence on, and limits, the throughput. A sausage processing apparatus with increased throughput is therefore desirable, especially since a downstream transfer or gripping device does not imperatively require the formation of sausage groups.

SUMMARY OF THE INVENTION

The invention is based on the problem of specifying a sausage processing apparatus which is improved in relation to this.

To solve the problem, according to the invention, a sausage processing apparatus is provided, comprising a circulating first transport device in the form of a compartmented belt, wherein a sausage can be received in each compartment, a downstream compartmented roller, wherein in each case one sausage can be transferred from a compartment of the first transport device into a compartment of the compartmented roller, and a second circulating transport device, onto which the sausages can be transferred from the compartments of the compartmented roller, a control device which controls the conveying operation of the first and second transport device and of the compartmented roller, and a sensor device for detecting the occupancy of the compartments of the first transport device, wherein the control device is configured to control the conveying operation of the compartmented roller and of the second transport device in a manner dependent on the detection result of the sensor device such that, upon detection of one or more successive unoccupied compartments of the first transport device, the conveying operation of the compartmented roller and of the second transport device is stopped or slowed when the unoccupied compartment is situated in or is entering a transfer position and, upon detection of an occupied compartment, said conveying operation is resumed when the occupied compartment is situated in or is entering the transfer position.

The sausage processing apparatus according to the invention comprises a first and a second transport device, wherein at least the first transport device is designed as a compartmented belt, and the second transport device may also be designed as a compartmented belt, or else as a simple conveyor belt. Between the two transport devices, or preferably the two compartmented belts, there is positioned a compartmented roller which serves as a transfer device in order to transfer the sausages from the first to the second transport device, that is to say preferably from the first compartmented belt to the second compartmented belt. Exactly one sausage can be received in each compartment of the first compartmented belt, and likewise in each compartment of the compartmented roller.

According to the invention, a sensor device is provided, which serves for detecting the occupancy of the individual compartments of the first transport device in order to thus detect whether or not a sausage is received in the compartment respectively passing said sensor device. Said sensor device communicates with a control device, which controls the conveying operation of the compartmented roller and at least of the second transport device, and possibly also of the first transport device. The control device is configured such that, with regard to the control of the conveying operation of the compartmented roller and of the second transport device, said control device can react to changing occupancies of the compartments of the first transport device such that the control roller and the second transport device can be stopped or slowed in terms of the transport speed when a compartment not occupied in a sausage enters or is situated in a transfer region, that is to say no sausage can be transferred into a compartment of the compartmented roller. Since the first transport device imparts a continuous conveying action, and an occupied compartment enters or is situated again in the region of the transfer position a short time after an unoccupied compartment has passed through, the control device resumes the conveying operation of the compartmented roller and of the second transport device by starting up the compartmented roller and the second transport device again, or accelerating these to the setpoint speed again. The transfer is continued until a stoppage or a slowing of the compartmented roller and of the second transport device occurs again owing to an unoccupied compartment. This intermittent working operation or conveying operation of the compartmented roller and of the second transport device which is dependent on the actual occupancy of the compartments of the first compartmented belt makes it particularly advantageously possible for the sausages that are transported in, or the sequence of sausages, to be condensed in that each individual compartment in the compartmented roller is occupied, and consequently any gaps in the sausage sequence are closed or smoothed out, and a continuous, gapless row of sausages can be transferred onto the second transport device. Accordingly, a smoothing-out device is specified which makes it possible for a continuous row of sausages to be formed from the somewhat random placement of the sausages on the first transport device, which is associated with an uneven sequence of sausages.

The sausage processing apparatus according to the invention accordingly has merely a very simply designed compartmented roller, which may be a metal component, composed preferably of high-grade steel, with compartments formed on the outer side, though may also be a plastics component, composed preferably of PTFE, PE, PP or POM. A grouping device of complex design is not provided because it is specifically the case that no grouping but rather a continuous row, or the formation of a closed row, is realized in the case of the sausage processing apparatus according to the invention. This row formation is advantageous with regard to an increase in throughput, because the closing of the gaps takes place considerably more quickly than the formation of individual sausage groups, with the filling of the individual drums etc., as is provided in the prior art. This is because, according to the invention, the smoothing-out of a gap results only in an extremely short stoppage or a very short slowing of the conveying operation of the compartmented roller and of the second conveying device, which, with regard to the high transport speed of the first transport device and the fact that a throughput of several hundred sausages per minute is implemented, lies in the range of only a few tens or hundreds of milliseconds, depending on how large the gap is that is to be closed. Aside from the simplification in terms of the construction, this is also associated, in the case of the sausage processing apparatus according to the invention, with an increase in the throughput.

As described, it is also preferable for a compartmented belt to be provided as the second transport device, wherein one sausage from one compartment of the compartmented roller can be transferred into each compartment. Alternatively, said compartmented belt may also have larger compartments, such that multiple sausages from multiple compartments of the compartmented roller can be transferred into one compartment of said second compartmented belt. As an alternative to the use of such a compartmented belt, the second transport device may also be equipped with trays or the like into which the sausages are dispensed from the compartmented roller.

For a simple transfer of the sausages from the first transport device onto the compartmented roller and from the latter onto the second transport device, it is expedient if the compartmented roller is below the end of the first compartmented belt and the start of the second transport device, in particular of the second compartmented belt, is below the compartmented roller, wherein a first guide device is provided which engages around the end of the first compartmented belt and which extends into the region of the upper transfer position, and a second guide device is provided which engages around the compartmented roller in the region between the upper transfer position and the lower transfer position from the compartmented roller to the second transport device, in particular the second compartmented belt. By means of this arrangement of the components involved one above the other, a simple transfer is possible, because the sausages can fall from one compartment into the other, or from the first transport device onto the compartmented wheel and from the latter onto the second transport device, under the force of gravity. Since all of the components involved are circulating components or sections in the relevant region, because the first compartmented belt is deflected at the end thereof and, from this, the sausages fall onto the imperatively circular compartmented roller, from which, in turn, in the lower region thereof, the sausages are dispensed onto the circulating second transport device, exact guidance of the sausages in these two transfer regions is necessary. For this purpose, two correspondingly designed guide devices, which correspond to the rounded form of the local transport path, in the form of suitable guide or directing plates or rails or the like are provided, which guide the sausages into the corresponding, curved and downwardly running transport paths. By means of these guide devices, the sausages are advantageously prevented from falling out, or an incorrect transfer is advantageously prevented.

One of the central elements is the sensor device, which serves for detecting the occupancy of the individual compartments of the first compartmented belt. Said sensor device is expediently arranged upstream of the transfer position. It may either be arranged directly upstream of the transfer position, though it is preferably situated a certain distance upstream as seen along the transport path of the first transport device. Since the exact position of the positionally fixed sensor device, the length of the transport path until the transfer position is reached and the conveying speed of the first compartmented belt are known, the control device can, based on these parameters, extremely exactly determine the exact point in time at which, upon detection of an unoccupied compartment, said compartment enters the transfer position, and, accordingly, also exactly determine the point in time at which the compartmented roller and the second transport device must be stopped or slowed. In this way, highly exact control of the conveying operation of the compartmented roller and of the second transport device is possible, such that exact positioning accuracy is realized at all times. The first transport device, the compartmented roller and the second transport device are imperatively exactly synchronized with regard to the conveying speed, such that the position reference of the individual compartments with respect to one another is realized at all times, in order to ensure exact sausage transfer. Any irregularities that arise over the course of operation can be compensated by control measures, through corresponding detection of compartment positions or other markings on the corresponding components which enable the positioning of the components, that is to say of the transport devices and of the compartmented roller, with respect to one another to be inferred, during operation by means of a corresponding adaptation of the individual transport speeds for the purposes of recalibration.

As a sensor device, use is preferably made of a photo-optical sensor, that is to say a light barrier, which is actuated by a sausage situated in the compartment and which is not actuated if no sausage is situated in the compartment. The sensor device may be arranged laterally at the first compartmented belt, such that the detection is performed, as it were, longitudinally through the compartment and thus transversely with respect to the transport direction. Said sensor device may however alternatively also be arranged above the compartmented belt and illuminate the compartment in a downward direction from above (or vice versa). Alternatively, use may also be made of a camera with associated image evaluation, or a mechanical key sensor or a capacitive sensor.

Aside from the sausage processing apparatus itself, the invention furthermore relates to a method for handling sausages and to the use of a sausage processing apparatus of the type described above. Said method is characterized in that, upon detection of one or more successive unoccupied compartments of the first transport device, the conveying operation of the compartmented roller and of the second transport device is stopped or slowed when the unoccupied compartment is situated in or is entering a transfer position and, upon detection of an occupied compartment, said conveying operation is resumed when the occupied compartment is situated in or is entering the transfer position. As a result, this has the effect that each compartment of the compartmented roller between the receiving position, that is to say the transfer position, close to the first transport device and the release position close to the second transport device is occupied by a sausage, and the sausages can be transferred from the compartmented roller into a gapless row on the second transport device. If the second transport device is likewise a compartmented belt, then it is accordingly possible for one sausage from one compartment of the compartmented roller to be transferred into each compartment of said second compartmented belt, that is to say each compartment is occupied also in the case of said second compartmented belt. If relatively large compartments are provided which receive multiple sausages, then said multiple sausages are transferred in gapless fashion from the compartmented roller.

The detection of the compartment occupancy by means of the sensor device is preferably performed at a position upstream of the transfer position, wherein the control device, upon detection of an unoccupied compartment, determines the stopping time or the slowing time in a manner dependent on the conveying speed of the first transport path. Since the first transport path runs at a constant speed and the distance from the positionally fixed sensor device to the transfer position is known, it is accordingly possible for the control device to highly accurately determine the stopping time or slowing point based on these parameters. Since, after an unoccupied compartment, the sensor device continuously also detects a possible second or third, immediately subsequent unoccupied compartment, the control device can furthermore also exactly determine, in the case of such a relatively large gap, how long the compartmented roller and the second transport device must be stopped for, or how long slowing must be performed for, or what slowing speed must be set, until an occupied compartment enters the transfer position again and the compartmented roller, and the second conveying device, are again set in operation or accelerated to the setpoint speed.

Expediently, the sausages are transferred from the first compartmented belt to the compartmented roller arranged below the end of the first compartmented belt, and the sausages are subsequently transferred from the compartmented roller onto the start, arranged below said compartmented roller, of the second transport device, in particular of the second compartmented belt, wherein the sausages are guided by a first guide device, which engages around the end of the first compartmented belt and which extends into the region of the upper transfer positions, and by a second guide device, which engages around the compartmented roller in the region between the upper transfer position and the lower transfer position from the compartmented roller to the second transport device, in particular the second compartmented belt. In this way, reliable transport or reliable guidance is ensured even in the corresponding diverting regions.

The compartment occupancy itself is expediently detected by means of a photo-optical sensor, which communicates with the control device. The other abovementioned sensor types may alternatively also be used.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
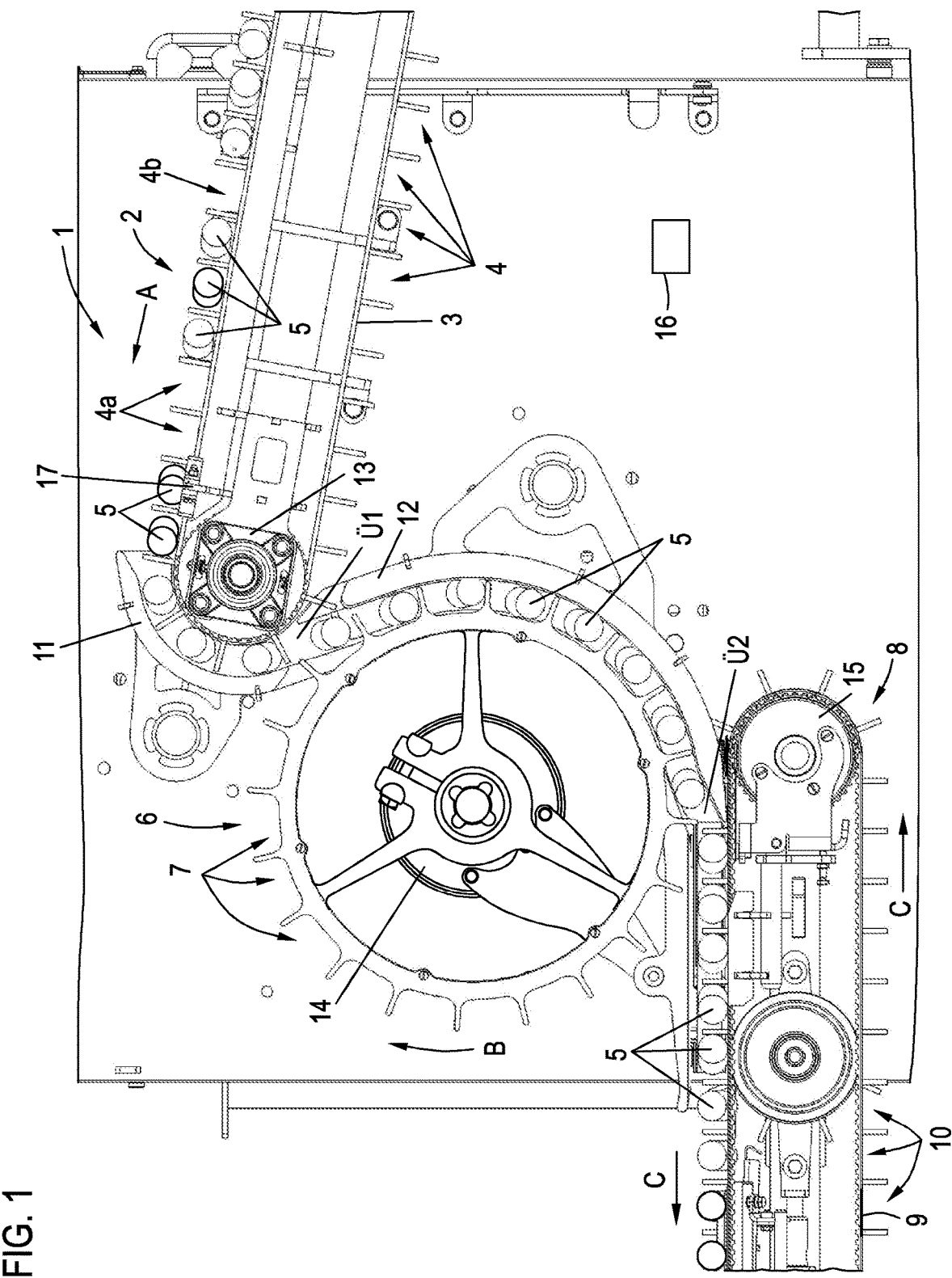
FIG. 1 shows a diagrammatic illustration of a sausage processing apparatus according to the invention.

FIG. 1 shows a sausage processing apparatus 1 according to the invention, comprising a first transport device 2 in the form of a compartmented belt 3 with a multiplicity of individual compartments 4, wherein sausages 5 are received at least in some of the compartments 4. Exactly one sausage 5 can be introduced into each compartment 4.

Also provided is a compartmented roller 6, which is arranged in the region of, and below, the diverted end of the first transport device 2. The compartmented roller 6 likewise has a multiplicity of individual compartments 7, which are formed on the outer side of the compartmented roller 6.

Finally, below the compartmented roller 6, there is arranged a second transport device 8, in this case also preferably in the form of a compartmented belt 9, with a multiplicity of individual compartments 10, wherein this compartmented belt 9, like the compartmented belt 3, circulates, that is to say is an endless belt. In this case, too, in the exemplary embodiment shown, exactly one sausage 5 is introduced into each compartment 10.

During operation, it is ideally the case that all three components, that is to say the first transport device 2, the compartmented roller 6 and the second transport device 8, are driven, as indicated by the movement arrows A, B and C. The arrow A indicates the circulating movement of the compartmented belt 3, which conveys the sausages in the direction of the arrow A. The arrow B indicates the rotation of the compartmented roller 6 in the arrow direction. Finally, the arrow C indicates the circulating conveying operation of the second compartmented belt 9, wherein the sausages are transported in the direction of the arrow C.

The first transport device 2 is assigned a guide device 11, which engages around the compartmented belt in the region of the diversion. Said guide device 11 extends into the region of a transfer position Ü1, where a sausage 5 is transferred from the first compartmented belt 3 to the compartmented roller 6. The first guide device 11 serves for preventing the sausages 5 from falling out before they reach the transfer position Ü1. The guide device 11 is for example a guide plate or multiple curved struts running parallel, or the like.

The compartmented roller 6 is also assigned a second guide device 12, which likewise engages in arcuate fashion around the compartmented roller 6 in certain portions and which also serves for preventing the sausages 5, which are conveyed downward as shown in FIG. 1, from falling out. The second guide device 12, likewise a plate or struts or the like, extends from the region of the first transfer position Ü1 into the region of a second transfer position Ü2, where the sausages 5 are transferred from the compartmented wheel 6 onto the second transport device 8.

For the drive of the first transport device 2, of the compartmented wheel 6 and of the second transport device 8, corresponding drive motors 13, 14, 15 are provided, which are controlled jointly by means of a control device 16 which is merely schematically indicated in FIG. 1. The control device 16 is in this case capable of separately and individually controlling the operation of all drive motors 13, 14, 15, and thus the conveying operation and the speeds both of the first transport device 2 and of the compartmented roller 6 and of the second conveying device 8. The individual conveying speeds are synchronized and must be exactly adhered to, because the compartments 4, 7 and 10 must always have an exact position relationship with respect to one another, because the sausages 5 are transferred from one compartment into the other, and accordingly the compartments must be moved exactly toward one another such that the sausages 5 can fall into the compartments.

As is clearly shown in FIG. 1, the sausages 5 are, at the first transfer position Ü1, transferred from a compartment 4 of the first compartmented belt 3 into a compartment 7 of the compartmented roller 6. At the second transfer position Ü2, the sausages are transferred from the compartment 7 into a compartment 10 of the second compartmented belt 9. If each compartment 4 on the first compartmented belt 3 is occupied by a sausage 5, this results in continuous compartment occupancy also on the compartmented wheel 6 and on the second compartmented belt 9, that is to say a closed row of sausages. However, if one or more successive compartments 4 on the first compartmented belt 3 is or are not occupied, then the sausage processing apparatus 1 according to the invention is capable of closing this gap, such that each compartment 7 on the compartmented roller 6 and also each compartment 10 on the second compartmented belt 9 is occupied.

For the detection of the compartment occupancy on the first compartmented belt 3, a sensor device 17 is used, preferably in the form of a photo-optical sensor, that is to say a light barrier. Said sensor device 17 is arranged in a fixed position laterally with respect to the first compartmented belt 3, such that the measurement beam illuminates the respective compartment 4 in a compartment longitudinal direction, that is to say transversely with respect to the transport direction A. The light beam is broken by each sausage 5 situated in a compartment 4. In the event of non-occupancy, the light beam is not broken. Based on the knowledge of the transport speed of the first compartmented belt 3, it is now possible for the control device 16, which communicates with the sensor device 17, to exactly detect, from the signal sequence output by the sensor device 17, whether or not a compartment 4 is occupied. If an unoccupied compartment 4 has been detected, this is thus registered at the control device 16. Said control device is configured to stop or slow both the compartmented roller 6 and the second compartmented belt 9 only when such an unoccupied compartment 4 enters, or is situated in, the transfer position Ü1. In this situation, there are, as it were, two unoccupied compartments, specifically the unoccupied compartment 4 and an unoccupied compartment 7, situated opposite one another, and the transfer of a sausage is inevitably not possible. The first compartmented belt 3 continues running, and the compartmented roller 6 and the second compartmented belt 9 are stationary or move onward at a slowed speed. Only when an occupied compartment 4 enters, or is situated in, the region of the transfer position Ü1 again, and a sausage 5 falls from the occupied compartment 4 into the still-unoccupied compartment 7, is the conveying operation of the compartmented roller 6 and of the second compartmented belt 9 resumed and continued synchronously with respect to the conveying operation of the first compartmented belt. The compartmented roller 6 and the second compartmented belt 9 thus start up again, or are accelerated again to the setpoint speed.

FIG. 1 shows, by way of example, only partial occupancy of the compartments 4 on the first compartmented belt 3. In the example, the two compartments 4a and one compartment 4b are not occupied, whilst the adjacent compartments 4 are occupied by in each case one sausage.

In the situation in FIG. 1, an occupied compartment 4 with a sausage 5 is situated in the region of the sensor device 17, and this is immediately followed by the first of the two unoccupied compartments 4a. The first compartmented belt 3, the compartmented roller 6 and the second compartmented belt 9 are circulating at the respective setpoint speed. FIGS. 2-13 now show, step by step, the further conveying operation of the individual components. Below, operation with a slowing of the conveying speed of the compartmented roller 6 and of the second transport device 8 will be described.

Figure 2:
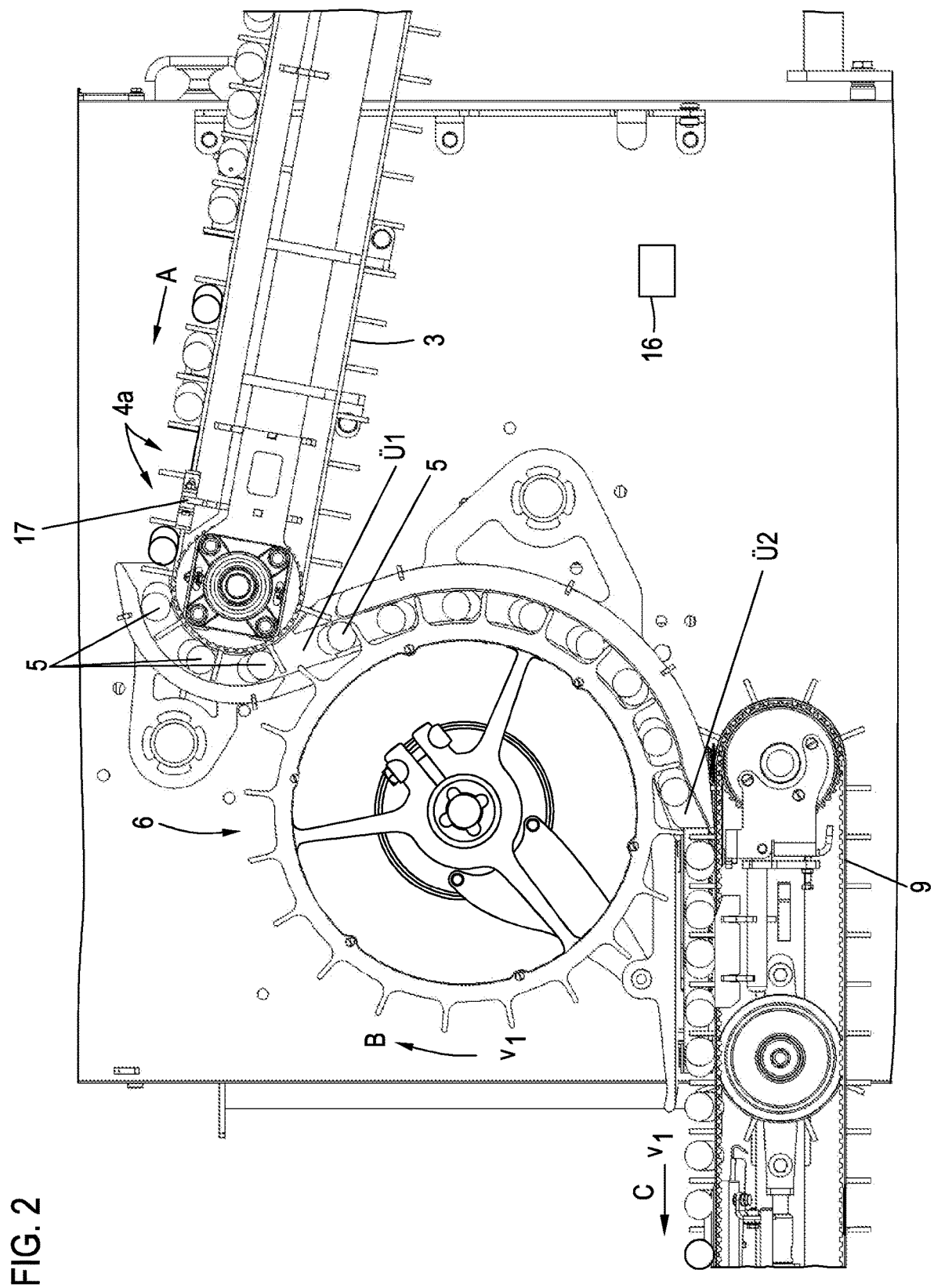
FIGS. 2-13 show illustrations of the sausage processing apparatus from FIG. 1 in progressive transport situations, for the purposes of explaining the operation of the sausage processing apparatus.

In the view in FIG. 2, the first unoccupied compartment 4a has entered the region of the sensor device 17, and the control device 16 registers this unoccupied compartment. Based on the known conveying speed of the first compartmented belt 3, the position of the sensor device 17 and thus the length of the transport path to the transfer position Ü1, the control device 16 can now exactly determine when said unoccupied compartment 4a enters the transfer position Ü1.

With the first compartmented belt 3, the compartmented roller 6 and the second compartmented belt 9 inevitably also move continuously onward, because, as viewed from the transfer position Ü1 to the first occupied compartment 4a, all compartments 4 situated between are each occupied by a sausage 5, and in the situation shown in FIG. 2, one sausage 5 is presently being transferred, in the transfer region Ü1, from the compartment 4 into a compartment 7.

Figure 3:
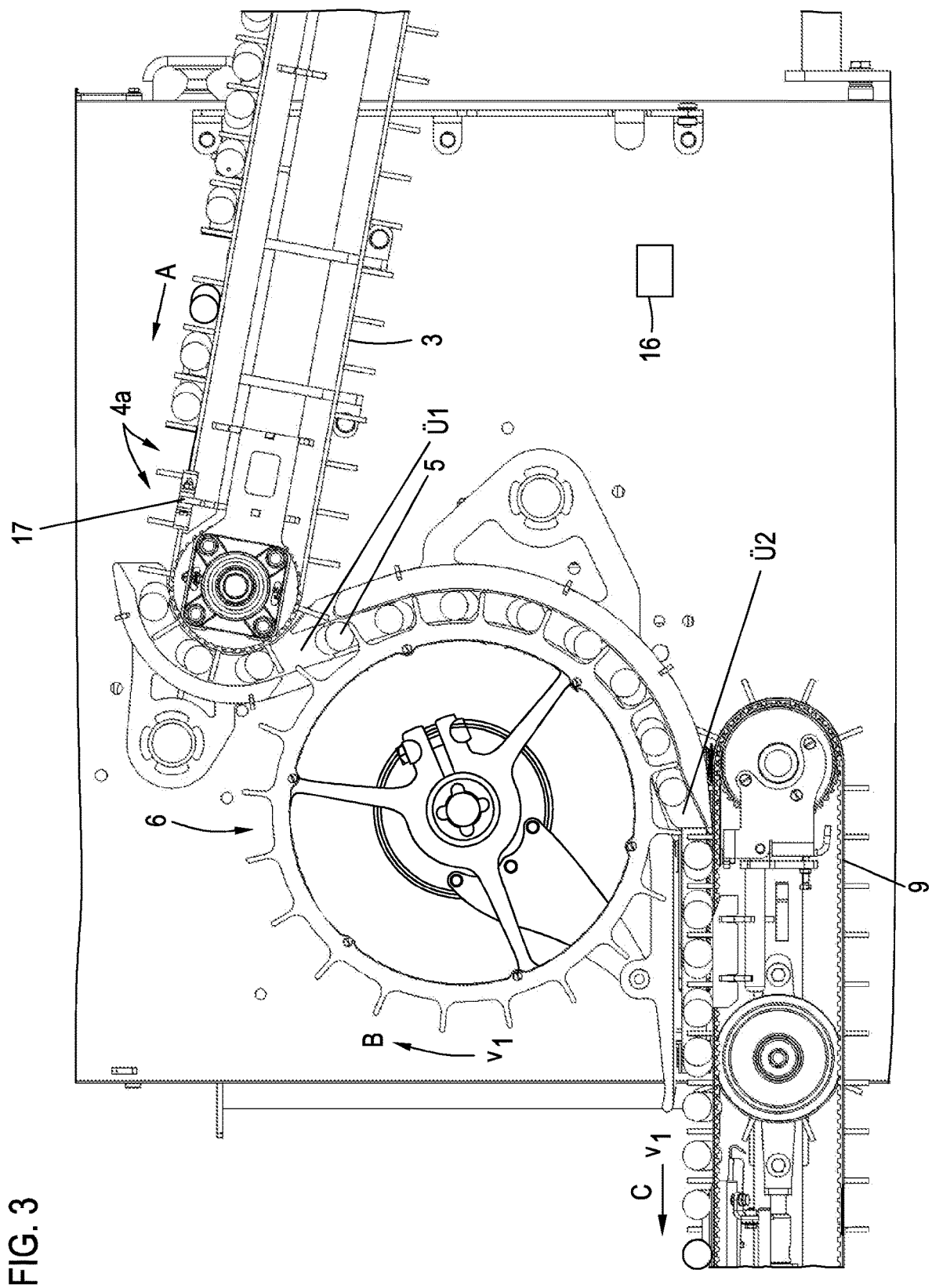

In FIG. 3, the second unoccupied compartment 4a has moved into the region of the sensor device 17, and again the control device 16 detects this second unoccupied compartment 4a and is accordingly capable of determining the overall duration for which the compartmented roller 6 and the second compartmented belt 9 must be slowed, and of determining the slowing speed.

The transfer operation continues as before, because it is still the case that occupied compartments 4 are present between the transfer position Ü1 and the first unoccupied compartment 4a, that is to say the compartmented roller 6 rotates, as before, at the setpoint speed, and also the second compartmented belt 9 conveys, as before, at the setpoint speed, and continuous transfers thus occur at the transfer positions Ü1 and Ü2.

Figure 4:
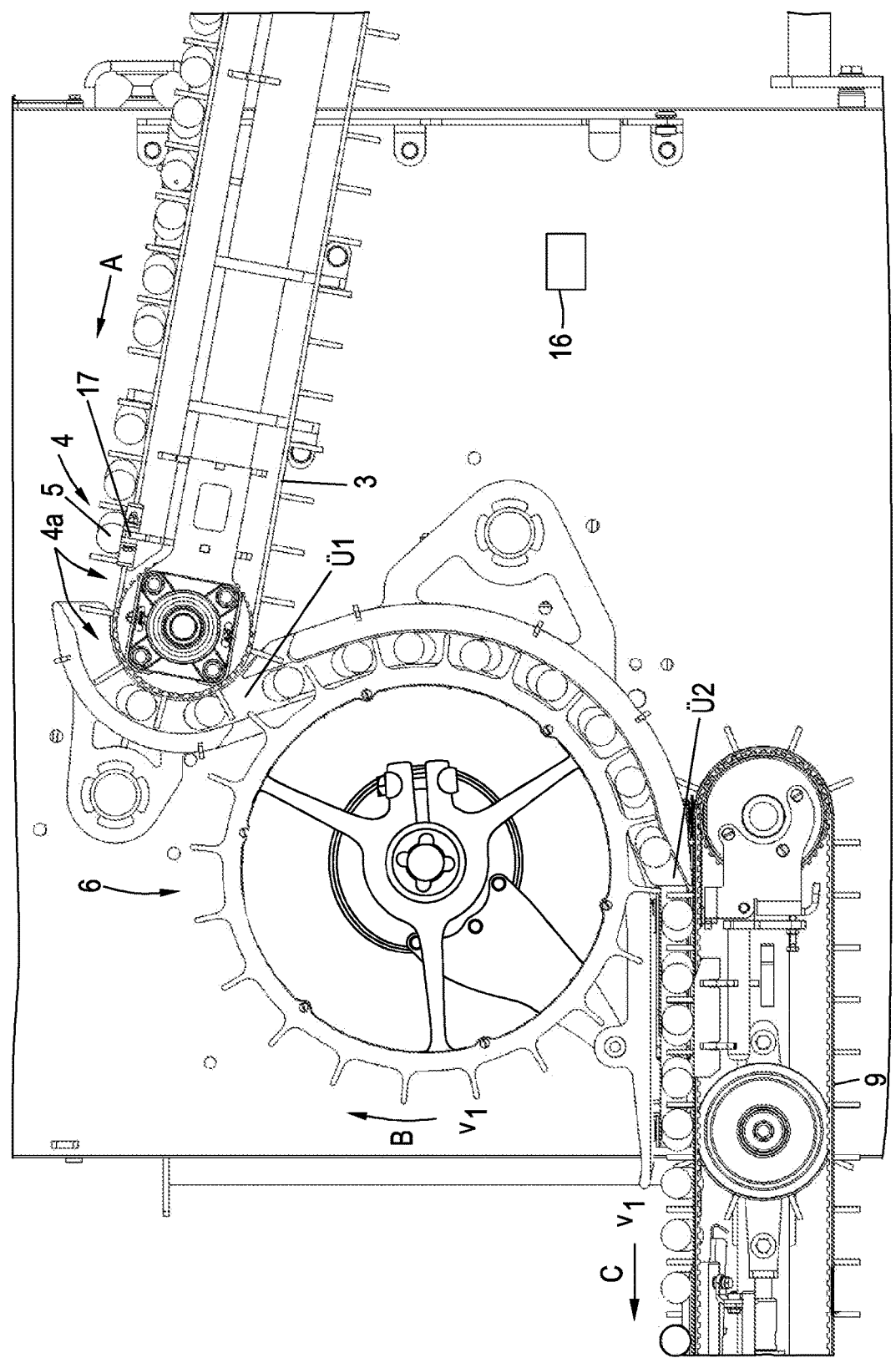

FIG. 4 shows the situation in which, after the second unoccupied compartment 4a, another occupied compartment 4 enters the region of the sensor device 17. The control device 16 detects this occupied compartment 4 and is now capable of determining the time at which, after a slowing, the compartmented roller 6 and the second compartmented belt 9 must run onward again at the setpoint speed in order to permit a new transfer.

As before, in addition to the first compartmented belt 3, the compartmented roller 6 and the second compartmented belt 9 are also in motion at the setpoint speed because, as before, sausages or occupied compartments 4 are entering the transfer region Ü1 and sausage transfer is possible.

Figure 5:
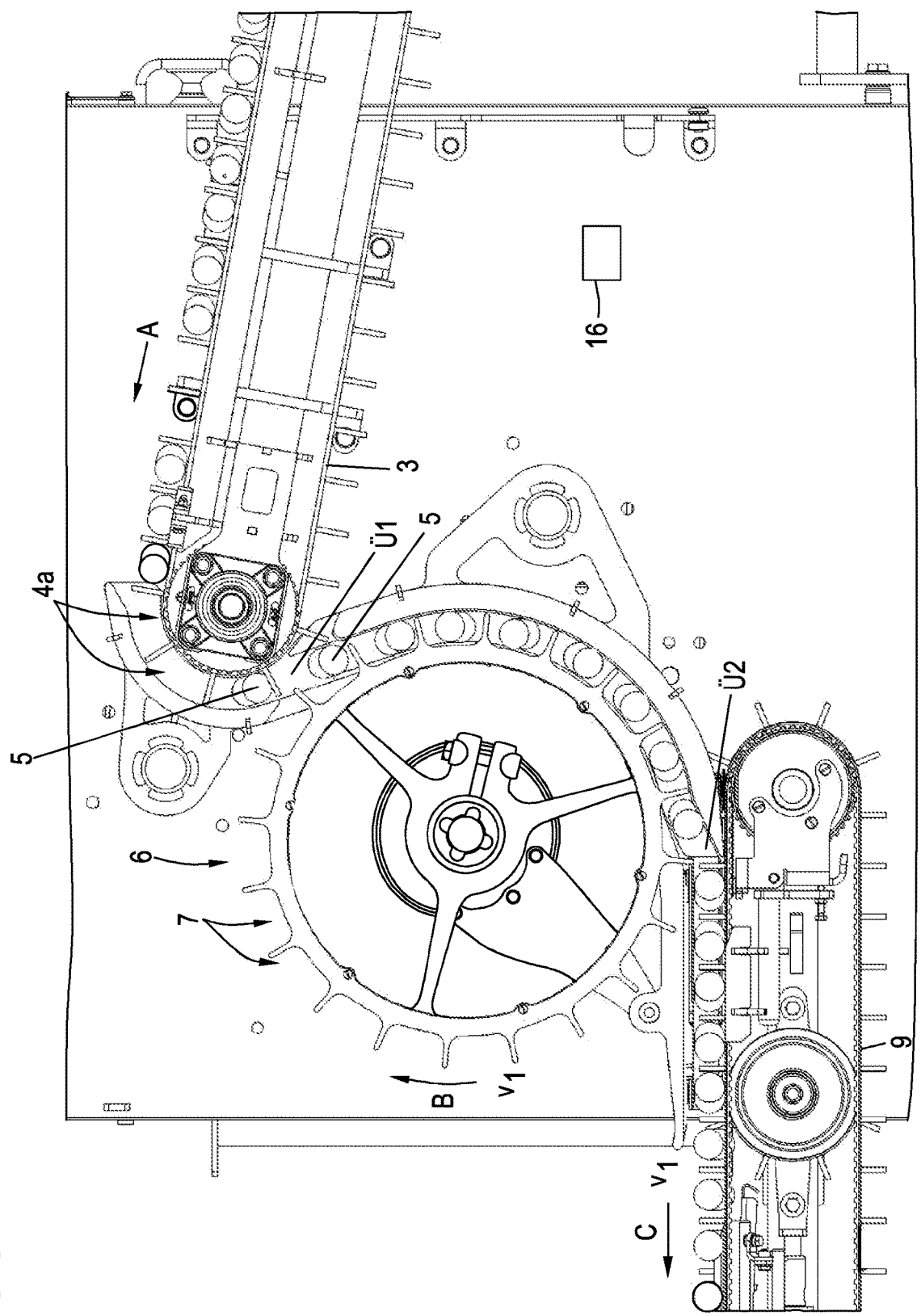
Figure 6:
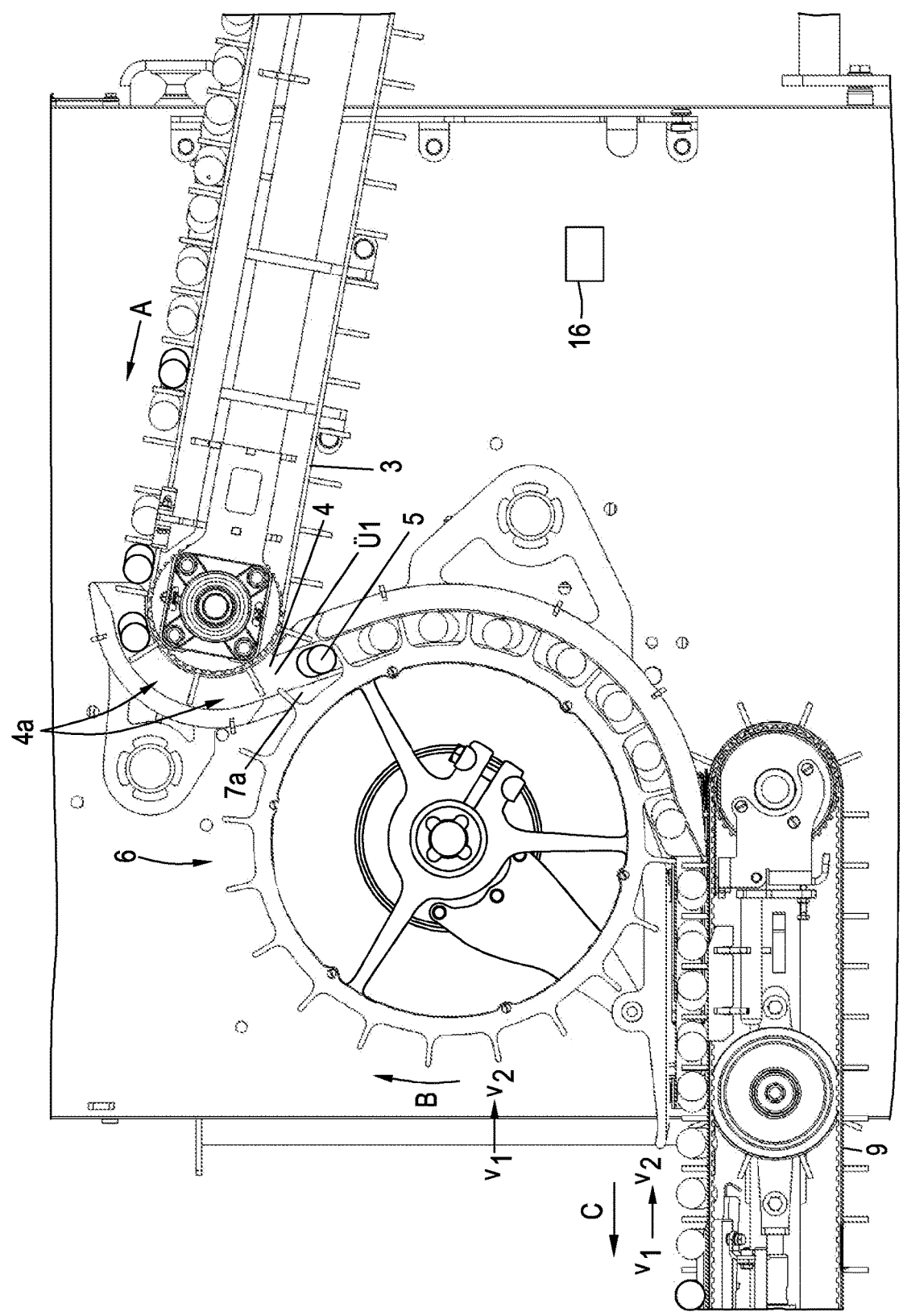

FIGS. 4 and 5 show the two successive situations in which the remaining sausages 5 situated between the transfer region Ü1 and the first unoccupied compartment 4a are still being transferred into the compartments 7 of the compartmented roller 6, and the transfer of the sausages at the transfer position Ü2 is also taking place as before. FIG. 6 shows the situation in which a sausage 5 is presently being transferred from the final occupied compartment 4 into the compartment 7a, and the immediately following compartment 4a is the first unoccupied compartment that is the first to enter the transfer position Ü1.

Figure 7:
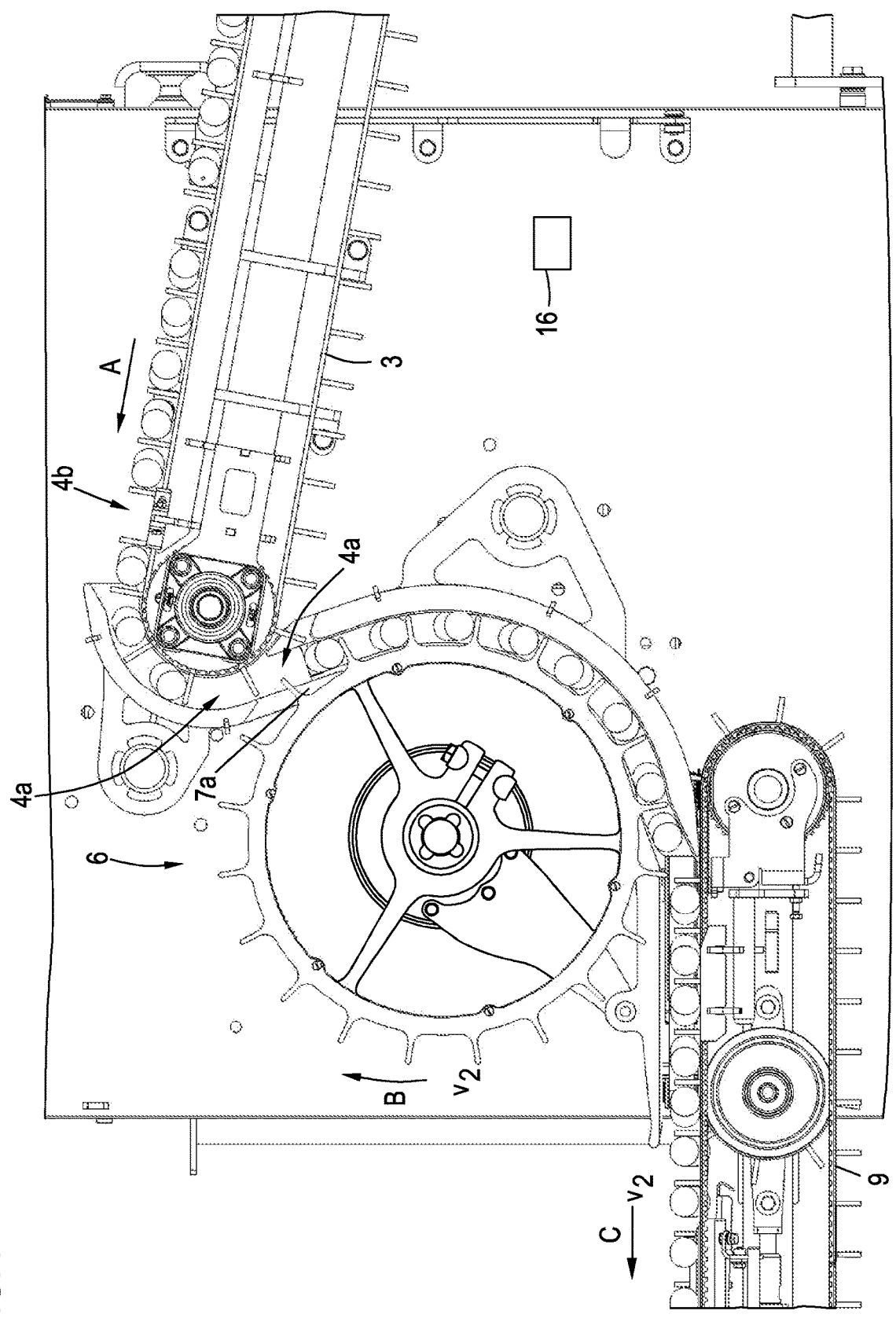

As described, FIG. 6 shows the situation in which the sausage 5 has just been transferred into the compartment 7a of the compartmented roller 6. Whilst the conveying speed of the first compartmented belt 3 is continuously maintained, the movement of the compartmented roller 6 and the transport speed of the second compartmented belt 9 is now temporarily slowed, and the speed is reduced from a setpoint speed v1 to a speed v2, as shown in FIG. 7. The compartment 7a accordingly travels more slowly than the compartments 4, or the two unoccupied compartments 4a, of the first compartmented belt. FIG. 7 shows the situation in which the compartmented roller 6 has rotated onward relatively slowly, and the compartment 7a is still situated adjacent to the transfer region Ü1, whilst the first unoccupied compartment 4a has already moved fully into the transfer region Ü1.

Figure 8:
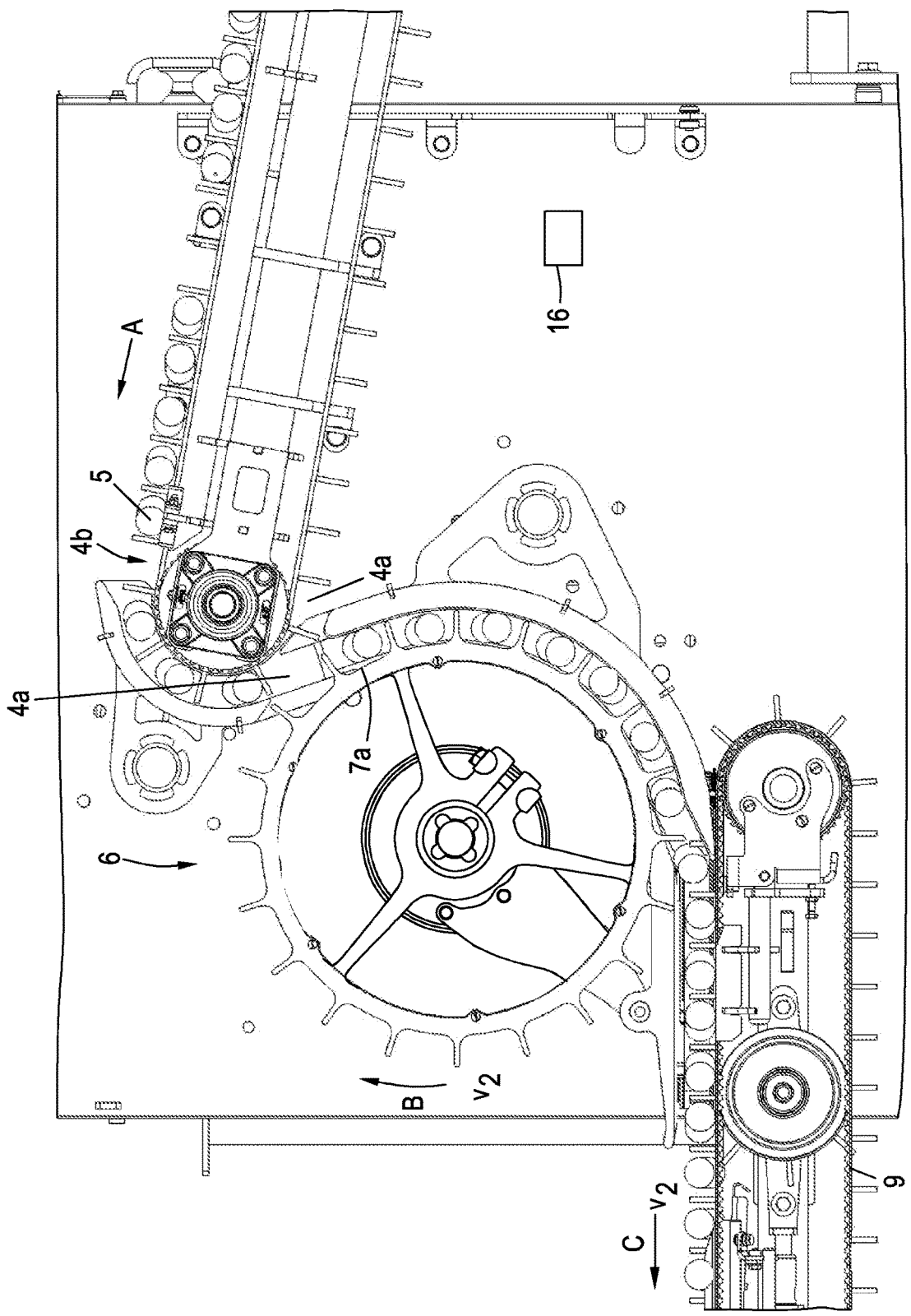

FIG. 8 shows the situation in which the second unoccupied compartment 4a is now situated in the region of the transfer position Ü1, and the compartment 7a has moved onward to a lesser extent owing to the reduced speed v2.

Figure 9:
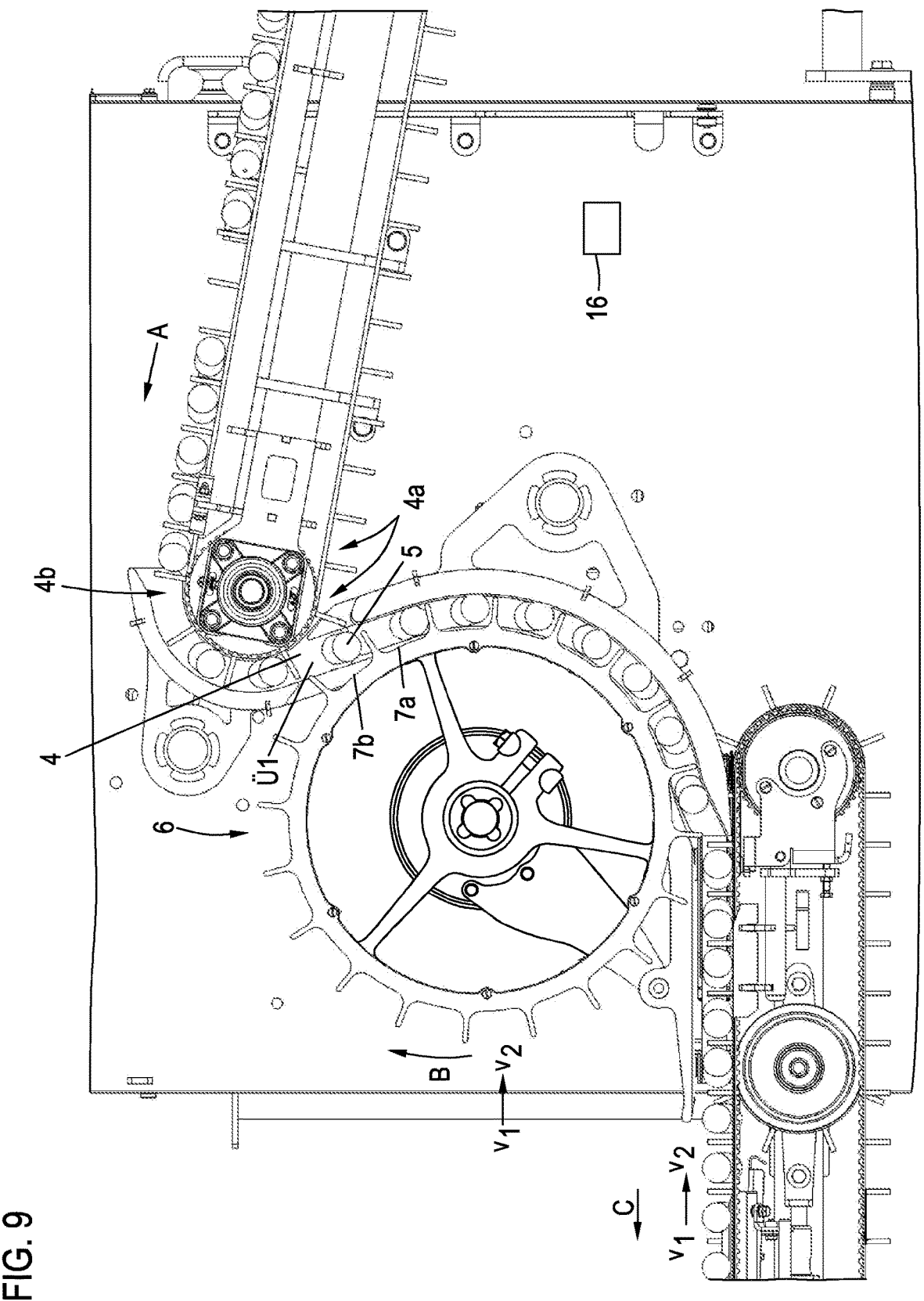

The further advanced operating situation is shown in FIG. 9. In said figure, the immediately following compartment 7b has now moved into the region of the transfer position Ü1, in which the occupied compartment 4 immediately following the second unoccupied compartment 4a is now also situated. The sausage 5 situated in the occupied compartment 4 is transferred into the compartment 7b, and a normal transfer takes place. At the same time as this, an acceleration occurs again, that is to say the speed is increased again from v2 to the setpoint speed v1, that is to say the compartmented roller 6 and the second compartmented belt 9 are accelerated again. This is because the two unoccupied compartments 4a have moved past, and the subsequent compartments 4 are again occupied (which has been detected continuously by the control device 16 by way of the sensor device 17), such that a further normal transfer process can take place.

It can be clearly seen, see FIG. 9, that all compartments 7, 7a, 7b on the compartmented roller 6 are occupied, and the two gaps in the unoccupied compartments 4a have accordingly been compensated for in the sausage chain.

As shown in FIG. 7, during the process discussed above, the further unoccupied compartment 4b has been moved into the region of the sensor device 17. The control device 16 detects this lack of occupancy too, and it is also detected (see FIG. 8) that a sausage 5 is again received in the immediately following occupied compartment 4. The control device has thus detected another gap, which is however shorter than the previous gap of the two unoccupied compartments 4a.

Figure 10:
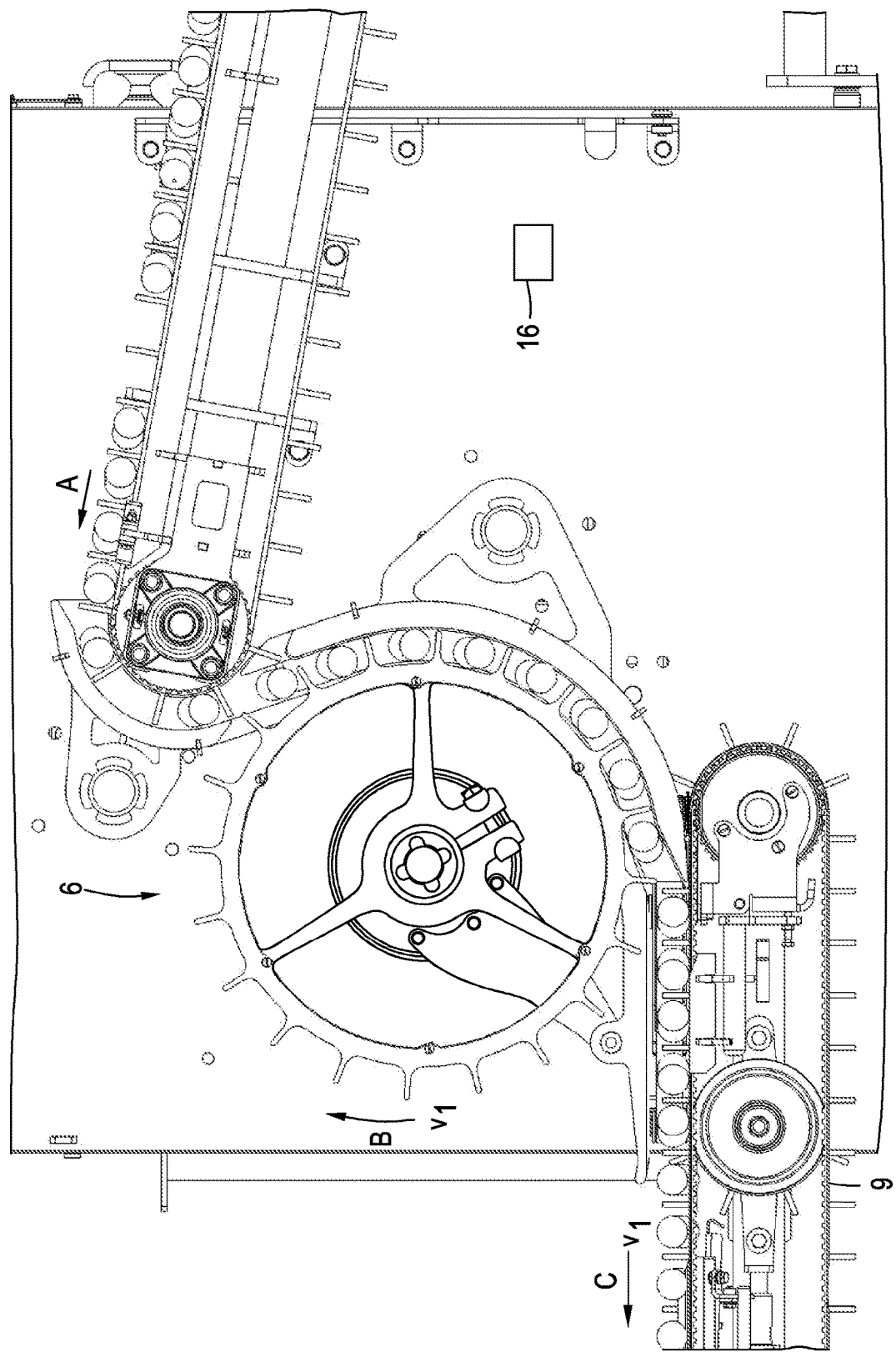
Figure 11:
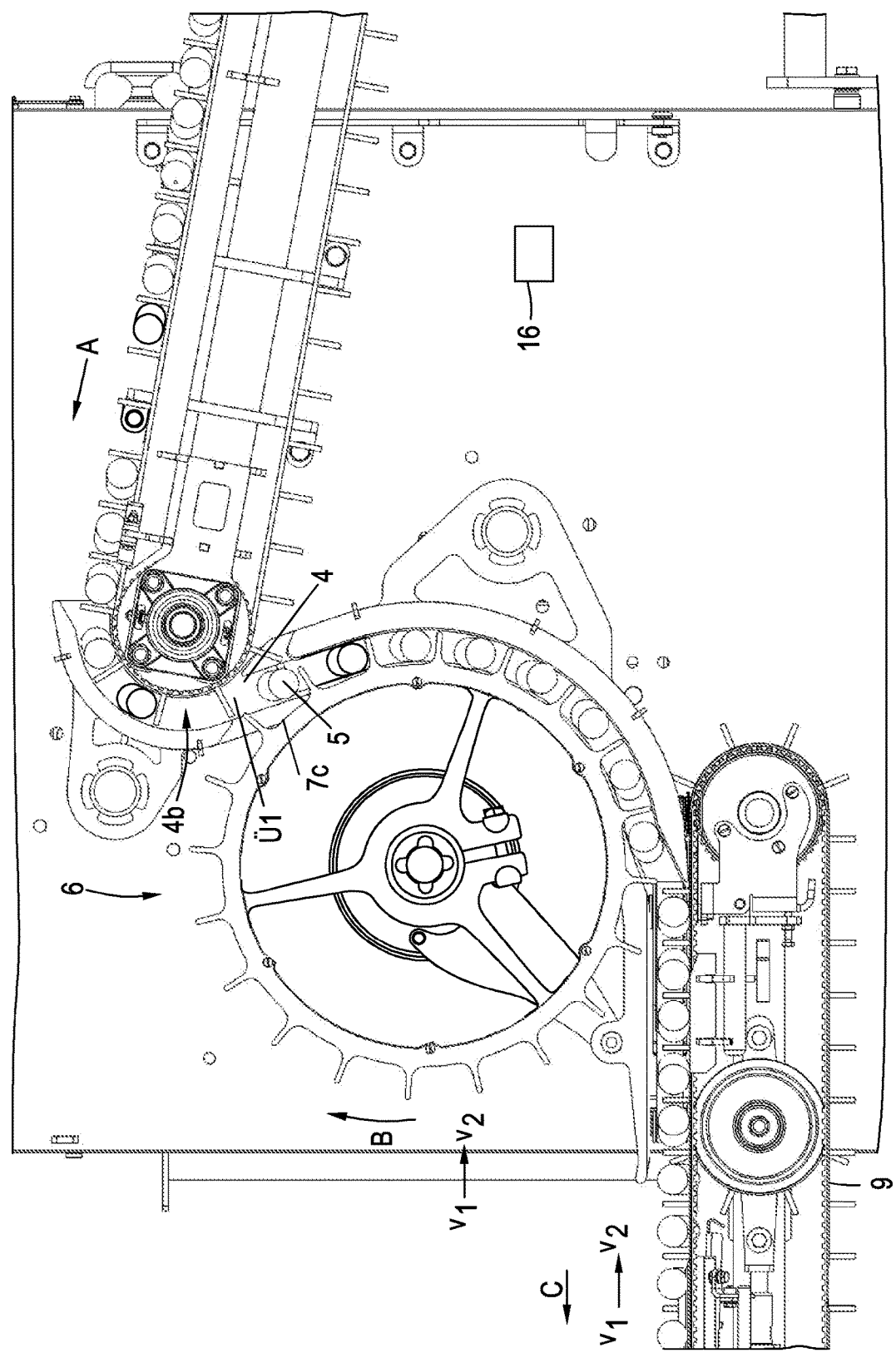

As shown in FIG. 9, the unoccupied compartment 4b is still spaced apart from the transfer position Ü1, and it is still preceded by two occupied compartments 4. The compartmented roller 6 and the second compartmented belt 9 run again at the normal speed v1, as shown in FIG. 10, and the normal transfer process takes place. It is likewise the case in FIG. 11, where the occupied compartment 4 situated ahead of the unoccupied compartment 4b has been moved into the transfer position Ü1, that the sausage 5 is being transferred into the compartment 7c.

Figure 12:
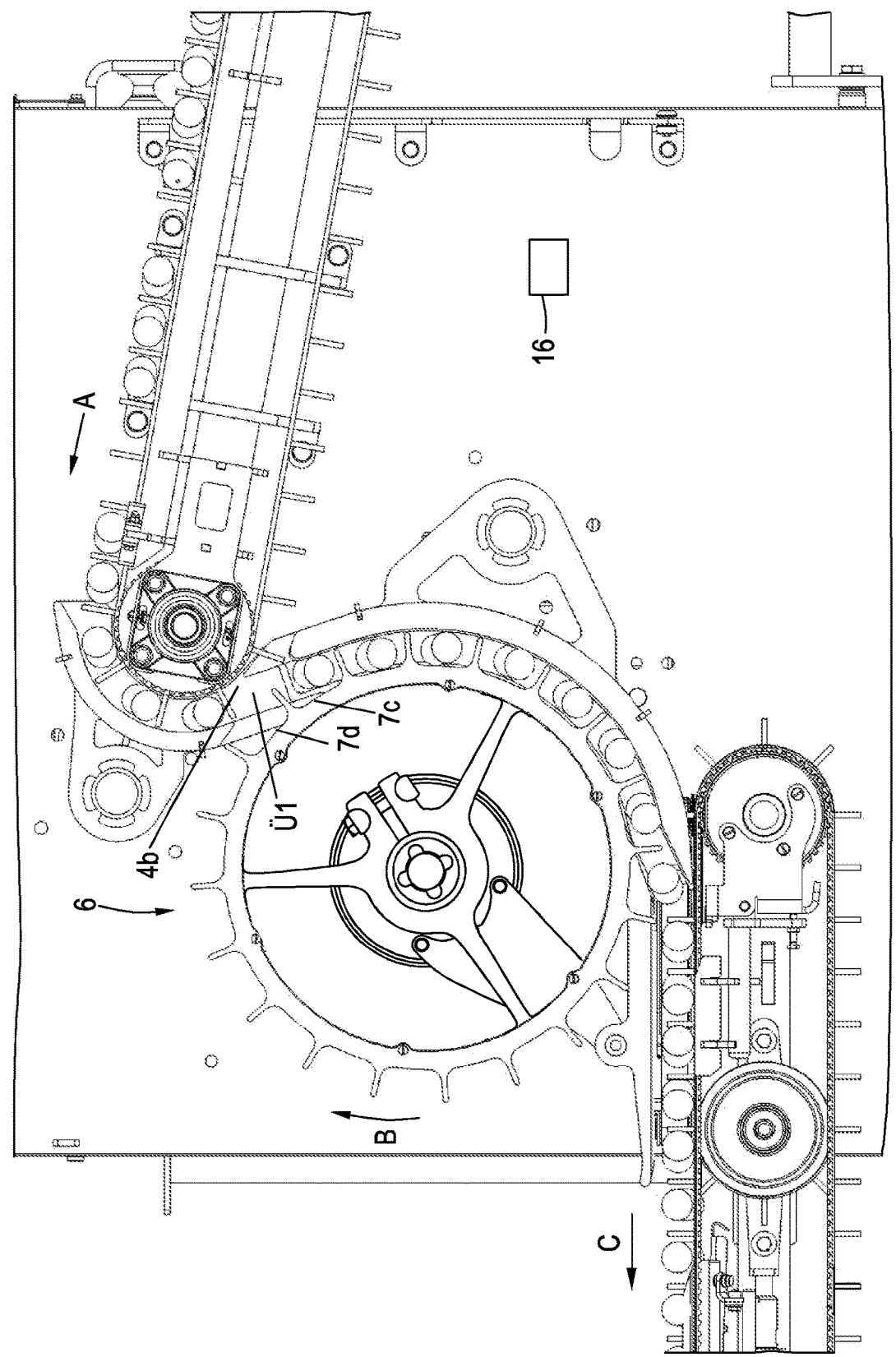

Since the unoccupied compartment 4b enters the transfer position Ü1 next, a slowing of the movement speed of the compartmented wheel 6 and of the second compartmented belt 9 occurs again, and the speed of both is again reduced from v1 to v2, such that the immediately following compartment 7d is rotated into the transfer region Ü1 more slowly than the unoccupied compartment 4b which, see FIG. 12, is passing through the transfer region Ü1.

Figure 13:
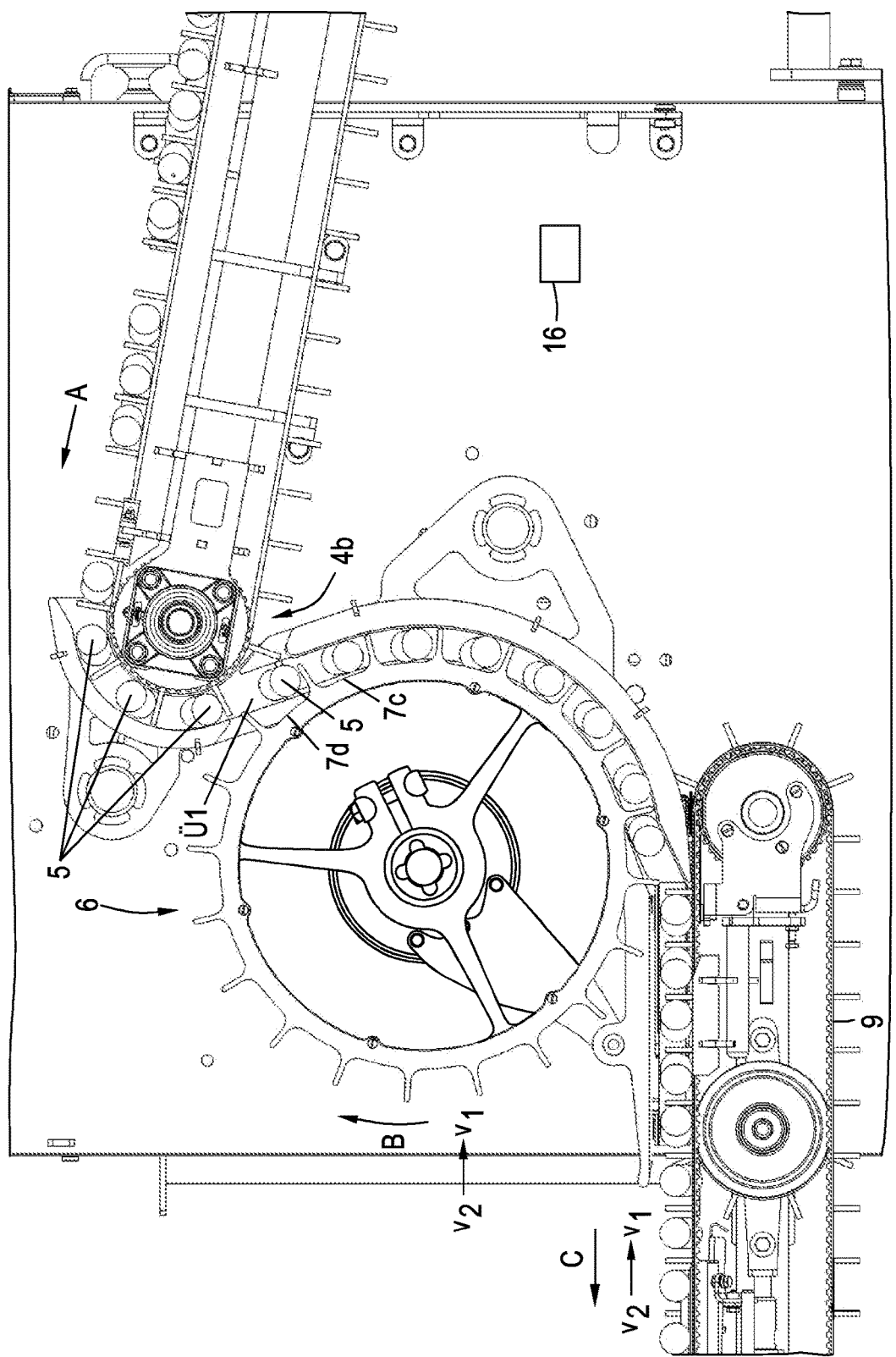

Finally, FIG. 13 shows the situation in which the unoccupied compartment 4b has been moved beyond the transfer position Ü1 and the immediately following occupied compartment 4 has been moved into the transfer position Ü1. At the same time, in association with this, the compartment 7d has also entered, such that a normal transfer of the sausage 5 from the occupied compartment 4 into the compartment 7d can take place again. Since it is the case, see FIG. 13, that again occupied compartments 4 with sausages 5 then follow, an acceleration of the compartmented roller 6 and of the compartmented belt 9 now occurs again from the speed v2 to v1, and the normal conveying operation is continued until another gap enters the transfer region Ü1.

As can be clearly seen, the gap that previously existed owing to the unoccupied compartment 4b has thus also been closed, and all compartments 7, 7a, 7b, 7c, 7d of the control roller 6 have been occupied in continuous fashion, and a continuous sausage chain is formed, which is then transferred in this form to the second compartmented belt 9, where it is likewise the case that each compartment 10 is occupied.

Even though the exemplary embodiments described above the control roller 6 and the second compartmented belt 9 are slowed in order to compensate for the gap, that is to say, as the compartment gap is passing by, move more slowly than the first compartmented belt 3, it is likewise conceivable for the compartmented roller 6 and the second compartmented belt 9 to also be completely stopped whilst the one or more unoccupied compartments pass by, and to be started up again when an occupied compartment enters the transfer region Ü1.

As described, the sausage processing apparatus according to the invention is part of a larger sausage processing or production installation, as is presented for example in DE 20 2015 104 994 U1. The sausage processing device according to the invention replaces the first conveying device presented in DE 20 2015 104 994 U1, the grouping device, and the second conveying device. Positioned upstream of said sausage processing device is the corresponding sausage filling and twisting-off device, and the sorting device which serves for sorting and introducing the sausages 5 into the compartments 4 of the first transport device 2, that is to say the first compartmented belt 3. Position downstream of said sausage processing device is the transfer or gripping device, possibly with an upstream sausage-orienting device, such as is described for example in the subsequently published German patent application DE 10 2017 123 517, which serves for orienting the curvatures of the sometimes curved sausages in the same direction.

While specific embodiments of the invention have been shown and described in detail to illustrate the inventive principles, it will be understood that the invention may be embodied otherwise without departing from such principles.

We claim:

1. A sausage processing apparatus, comprising a circulating first transport device in the form of a compartmented belt, wherein a sausage can be received in each compartment, a downstream compartmented roller, wherein in each case one sausage can be transferred from a compartment of the first transport device into a compartment of the compartmented roller, and a second circulating transport device, onto which the sausages can be transferred from the compartments of the compartmented roller, a control device which controls the conveying operation of the second transport device and of the compartmented roller, and a sensor device for detecting the occupancy of the compartments of the first transport device, wherein the control device is configured to control the conveying operation of the compartmented roller and of the second transport device in a manner dependent on the detection result of the sensor device such that, upon detection of one or more successive unoccupied compartments of the first transport device, the conveying operation of the compartmented roller and of the second transport device is stopped or slowed when the unoccupied compartment is situated in or is entering a transfer position and, upon detection of an occupied compartment, said conveying operation is resumed when the occupied compartment is situated in or is entering the transfer position.

2. The sausage processing apparatus according to claim 1, wherein the second transport device is a compartmented belt, wherein one sausage from one compartment of the compartmented roller or multiple sausages from multiple compartments of the compartmented roller can be transferred into each compartment.

3. The sausage processing apparatus according to claim 1, wherein the compartmented roller is below the end of the first compartmented belt and the start of the second transport device, in particular of the second compartmented belt, is below the compartmented roller, wherein a first guide device is provided which engages around the end of the first compartmented belt and which extends into the region of the upper transfer position, and a second guide device is provided which engages around the compartmented roller in the region between the upper transfer position and the lower transfer position from the compartmented roller to the second transport device, in particular the second compartmented belt.

4. The sausage processing apparatus according to claim 1, wherein the sensor device is positioned upstream of the transfer position.

5. The sausage processing apparatus according to claim 1, wherein the sensor device is a photo-optical sensor, a camera or a mechanical sensor.

6. The method for treating sausages using a sausage processing apparatus according to claim 1, wherein, upon detection of one or more successive unoccupied compartments of the first transport device, the conveying operation of the compartmented roller and of the second transport device is stopped or slowed when the unoccupied compartment is situated in or is entering a transfer position and, upon detection of an occupied compartment, said conveying operation is resumed when the occupied compartment is situated in or is entering the transfer position.

7. The method according to claim 6, wherein the second transport device is a compartmented belt, wherein one sausage from one compartment of the compartmented roller or multiple sausages from multiple compartments of the compartmented roller are transferred into each compartment.

8. The method according to claim 6, wherein the detection of the compartment occupancy is performed at a position upstream of the transfer position, wherein the control device, upon detection of an unoccupied compartment, determines the stopping time and the starting time or the slowing duration in a manner dependent on the conveying speed.

9. The method according to claim 6, wherein the sausages are transferred from the first compartmented belt to the compartmented roller arranged below the end of the first compartmented belt, and the sausages are transferred from the compartmented roller to the start, arranged below said compartmented roller, of the second transport device, in particular of the second compartmented belt, wherein the sausages are guided by a first guide device, which engages around the end of the first compartmented belt and which extends into the region of the upper transfer position, and by a second guide device, which engages around the compartmented roller in the region between the upper transfer position and the lower transfer position from the compartmented roller to the second transport device, in particular the second compartmented belt.

10. The method according to claim 6, wherein the compartment occupancy is detected by means of a photo-optical sensor, a camera or a mechanical sensor, which communicates with the control device.

* * * * *